United States Patent
Kovacs (10) Patent No.: US 7,008,997 B2
(45) Date of Patent: Mar. 7, 2006

(54) NON-TOXIC HYDROPHOBIC ELASTOMERIC POLYMER CHEMISTRY SYSTEM FOR WOOD PRESERVATION

(75) Inventor: Stephen G. Kovacs, Cary, NC (US)

(73) Assignee: Roof Matrix, Inc., Durham, NC (US)

( * ) Notice: Subject to any disclaimer, the term of this patent is extended or adjusted under 35 U.S.C. 154(b) by 15 days.

(21) Appl. No.: 10/757,294

(22) Filed: Jan. 14, 2004

(65) Prior Publication Data

US 2004/0147649 A1    Jul. 29, 2004

Related U.S. Application Data

(63) Continuation-in-part of application No. 10/223,991, filed on Aug. 20, 2002, now abandoned.

(51) Int. Cl.
*C08G 18/65* (2006.01)
(52) U.S. Cl. .................. 524/770; 524/871; 428/425.1; 427/393; 528/68
(58) Field of Classification Search .................. None
See application file for complete search history.

(56) References Cited

U.S. PATENT DOCUMENTS 5,302,660 A    4/1994    Klinksiek et al.
5,962,618 A    10/1999    Primeaux, II et al.

*Primary Examiner*—Rachel Gorr
(74) *Attorney, Agent, or Firm*—Coats & Bennett, P.L.L.C.

(57) ABSTRACT

A system and method for wood preservation comprises treating wood products via conventional pressure treating mechanics of sequential vacuum and pressure with a solution comprising an oligomeric, stoichiometrically balanced blend of primary and secondary diamines with modified diphenylmethane diisocyanates and a carrier solvent/reactant. Upon application, the carrier solvent/reactant evaporates, allowing polymerization of the remaining solution constituents to form a non-toxic, hydrophobic, elastomeric polyureathane linked copolymer that provides a long-term barrier against rot, environmental, termite and mold/fungus attack. Complete polymer impregnation of the wood's interstitial fiber space enables the hydrophobic property of the polymer to provide a long-time barrier to water penetration. Alternatively, the polymer may be surface applied to provide both protection and to prevent leaching out of CCA chemicals in the case of conventionally treated wood. The polymer is also an effective termiticide.

50 Claims, 1 Drawing Sheet

POLYTETRAMETHYLENE OXIDE-DI-P-AMINO BENZOATE

Figure 1 r = end-to-end distance
s = radius of gyration

Figure 2

NON-TOXIC HYDROPHOBIC ELASTOMERIC POLYMER CHEMISTRY SYSTEM FOR WOOD PRESERVATION

This application is a Continuation In Part of Ser. No. 10/223,991, filed Aug. 20, 2002, now abandoned.

BACKGROUND

The present invention relates generally to a system and method of wood preservation, and in particular to a polymer chemistry system that provides a non-toxic, hydrophobic, elastomeric wood preservative for deterring rot, environmental degradation, termite and mold/fungus attack.

Wood is an economical and renewable building resource. However, untreated wood is subject to attacks by insects, micro-organisms, decay, fungi and environmental weather degradation primarily associated with continuous solar ultraviolet exposure, and long-term cyclic rain, snow and heat exposure. To ensure long-term structural performance, wood must be protected from its natural and environmental predators. Preserved wood is lumber or plywood that has been treated with wood preservatives to protect it from termites and fungal decay. Wood preservation is the process by which wood is preserved. There are a variety of wood preservatives and application methods used, including high pressure impregnation, low pressure and vacuum methods of preservation application, dip treatments and brush or spray-on application methods. Current wood preservation methods are the result of virtually a total focus on the problem of wood preservations and preservatives, with no consideration or evaluation of the long-term consequences of their continued use.

For the past three decades, wood treated with copper, chromium, and arsenic (CCA) has demonstrated unquestionable effectiveness in deterring rot, decay and termite attack. It has become the standard by which to measure the performance and longevity of most wood used for outdoor construction. Today, however, there is an increasingly growing public awareness and concern regarding the negative consequences of the use of toxic heavy metals and environmentally hazardous chemicals in products to which the general public is exposed. These negative aspects have only been observed and determined as a result of long-term use and application.

Federal regulations—notably those of the EPA—list CCA as a wood preservative, but the EPA reached an agreement with lumber companies in February 2002, to phase out its use as a wood preservative in residential/human contact wood products by December 2003. The basis for this phase-out is extensively supported and well established via independent studies by both various government agencies and academic institutions, e.g. EPA, USDA, USPHS, HHS, University of California, Chicago, Alabama, Colorado, to name a few. Collectively, these studies have thoroughly established that CCA is both toxic and a human carcinogen.

On Jul. 11, 2003, a class action lawsuit was filed in federal court claiming that Georgia Pacific Corporation knowingly exposed customers to the toxic human carcinogen known as CCA. Not only is CCA recognized as a toxic human carcinogen, it is now recognized as having a waste disposal problem. Old treated lumber which has dried out, split, warped or twisted during its structural use cannot be disposed of via ordinary methods. It cannot be burned, since the copper, chromium and arsenic parts of CCA produce a lethal variety of toxic gases, which if briefly inhaled by humans of high toxic sensitivity, can cause a variety of serious, if not lethal, neurological disorders of long-term chronic persistence. Although originally considered as anecdotal evidence, occurrences such as livestock dying within one week after being exposed to the downwind gases of burning waste CCA-treated wood, and the cumulative incidences of such events are now regarded as another compelling basis for the classification of CCA as a toxic human carcinogen.

It is an established fact that water-based preservatives continually "leach-out" slowly over extended periods of time. This leaching out is unavoidable since it is a chemistry maxim that water-based solubles will always manifest themselves in their solid crystalline molecular structure form when not in a dissolved state, e.g., Sugar. Leach-out is a direct result of environmental exposure to rain water, melting snow, high humidity, groundwater, and the like. Thus, waste CCA-treated wood cannot be hauled off to a community landfill nor buried, since the toxic CCA will continue to leach out until depleted. The continuous leaching is an excellent vector source for ground water toxic contamination and spreading migration of aquatic toxicity.

Thus, not only is there a need in the art for a system of wood preservation that resists termites and wood decay, as a replacement for the widespread practice of CCA treatment, there is additionally an acute need for a method of containing CCA and similar carcinogens within existing treated lumber and preventing the harmful chemicals from leaching out.

A growing and significant concern about the present use of long-term, persistent toxic hydrocarbons as termicides has resulted in increasing studies on extractives of woods resistant to termites. (Wolcott, 1953; Becker, 1971; Carter, et al., 1978; Jurd and Manners, 1980). Extractives are natural products extraneous to a lignocellulose wall, the cellulose fibers which define the wood's structural fiber composition. They can be removed with inert solvents such as acetone, ethers, and benzene/alcohols. Extractives are from two general sources. The first source are the components involved in a tree's metabolic processes; the second are artifacts resulting from further modification of metabolites by external sources, or means other than a tree's metabolic processes. The knowledge of natural termite resistance of various wood species is important, because either naturally resistant woods or chemically treated susceptible woods are needed in places where wood is exposed to termite attack. The termite resistance of certain wood species results primarily from their organic constituents that are distasteful, repellent or toxic to termites. Although having any or all of these three properties is sufficient to define a relatively effective termicide, a source of reliable and effective extractives is presently viewed as being literally inadequate to meet the demands of today's commercial lumber industry, whose major products are treated Southern Yellow Pine and oak lumber. Thus, there exists a need in the art for a system of wood preservation via present impregnation methods that does not rely on toxic chemicals or termicidal organic wood extractives as a long-term preservative against the devastation caused by termite attacks.

In light of these and other deficiencies in the state of the art, the following objectives of the present invention are enumerated. It should be noted that not all, or necessarily any, of these objectives may be fully met in any given embodiment of the present invention.

It is an objective of the present invention to provide a polymer-based chemistry system for wood preservation and preservatives, which does not contain cooper, chromium, arsenic or other EPA-classified hazardous chemicals.

It is a further objective of the present invention to provide a polymer-based chemistry system for wood preservation and preservatives that is non-toxic to humans.

It is a further objective of the present invention to provide a polymer-based chemistry system for wood preservation and preservatives that is non-carcinogenic to humans.

It is a further objective of the present invention to provide a polymer-based chemistry system for wood preservation and preservatives that is hydrophobic in the cured state.

It is another objective of the present invention to provide a polymer-based chemistry system for wood preservation that is not water-based, for the purpose of eliminating water-based preservative leaching.

It is also an objective of the present invention to provide a polymer-based chemistry system for wood preservation and preservatives that does not depend on solvent-borne non-polymer materials, e.g. paraffins, terpenes, waxes, or linolenes—for the purpose of producing a barrier to water penetration of wood.

It is another objective of the present invention to provide polymer-based chemistry system for wood preservation and preservatives that is inherently termicidal by nullifying termites' ability to digest the lignocellulose fiber construction of wood permeated with impregnation of the system formulations.

It is yet another objective of the present invention to provide a polymer-based chemistry system for wood preservation and preservatives characterized by low viscosity in the applied liquid state in order to facilitate maximum wood impregnation at moderate values of vacuum and pressure, e.g. 15–18 mm vacuum and 25–50 psi pressure.

It is also an objective of the present invention to provide a polymer-based chemistry system for wood preservation that permits a significant reduction in post-impregnation drying time, e.g. from several days to several hours.

It is also an objective of the present invention to provide a polymer-based chemistry system for wood preservation that meets non-hazardous landfill requirements for waste disposal and/or can be buried with no toxic biodegradable results.

It is also an objective of the present invention to provide a polymer-based chemistry system for wood preservation and preservatives that does not adversely respond to solar ultraviolet exposure (approx. 3,600 angstroms). This response characteristic eliminates ultraviolet degradation effects of current preservative methods, such as preservative crystallization, loss of product homogenuity due to structural embrittlement, and continual weather erosion loss of degraded product.

It is also an objective of the present invention to provide a polymer-based chemistry system for wood preservation and preservatives that provides a liquid polymer-based solution for wood impregnation. Immediately upon impregnation, polymerization from the liquid phase to a permanent solid phase is initiated, by virtue of the chemical reactivity of the solution, without requiring, relying on, or modifying external ambient conditions, e.g. temperature, atmospheric pressure, or relative humidity.

It is a further objective of the present invention to provide a polymer-based chemistry system for wood preservation that, when liquid applied via whole-body impregnation or surface penetration methods, is polymerized to a solid-state polyurethane/urea thermoset polymer.

It is yet a further objective of the present invention to provide a polymer-based chemistry system for wood preservation and preservatives that, when applied either as whole-body liquid impregnation or surface penetration, produces a solid-state polyurethane/urea with significant elastomeric properties. Furthermore, an objective of the present invention is an elastomeric property having a % distention-to-yield value of about 450% to 680%, depending on formula composition. The high value of this physical parameter may enable long-term immunity (such as in excess of 10 years) to the degradation effects of weather-related annual thermal stresses associated with shrinking and expansion—as is experienced by non-elastomeric thermoplastic materials.

It is a still further objective of the present invention to provide a polymer-based chemistry system for wood preservation that, when used as a surface penetration, can be applied to damp wood, i.e. wood with a temporary, heavy moisture content acquired from recent prior exposure to rain, snow, or excessive humidity.

It is also an objective of the present invention to provide a polymer-based chemistry system for wood preservation that has no solar ultraviolet exposure-induced objectionable color-tone change, i.e., darkening.

It is also an objective of the present invention to provide a polymer-based chemistry system for wood preservation that enables the inclusion of a wide variety of stains and colorings into the system at the time of system application.

It is also an objective of the present invention to provide a polymer-based chemistry system for wood preservation with a variety of embodiments developed for specific application methods.

SUMMARY OF THE INVENTION

The present invention achieves these and other objectives by providing a method for wood preservation using polymer-based chemistry formulations which are non-toxic, non-carcinogenic, hydrophobic, elastomeric, and contain no heavy metals or environmentally hazardous ingredients, per EPA restrictions and regulations.

In one embodiment of the present invention there is provided a method for making a polymerizable, elastomeric, hydrophobic thermoset material for use as a wood preservative using current or other suitable practices and means for wood impregnation, comprising combining an oligomeric, stoichiometrically balanced blend of primary and secondary diamines with modified diphenylmethane diisocyanates and a one or more carrier solvent/reactant(s) to form a solution; coating or impregnating wood products with the solution; and drying the solution to form a polyurethane/urea linked copolymer coated or impregnated wood product.

DETAILED DESCRIPTION OF THE INVENTION

The formulations for wood preservation are essentially developed as a single, sequential step mixing process wherein the desirable properties of the formulations are obtained by blending the desired reactants in a single sequential step procedure. For example, the following blend/ mixture of components has been determined to achieve one or more of the desired objectives of the present invention:

1) An oligomeric, stoichiometrically balanced blend of primary and secondary diamines as a pre-polymer.

2) Specific modified diphenylmethane diisocyanates used for polymer chain extension in order to obtain a cured polyureathane/urea polymer.

3) A primary carrier solvent/reactant, such as for example acetone aka propanone.

4) Optionally, a secondary carrier solvent/reactant, such as for example mineral spirits.

5) Optionally, additives, such as a polyether oxyalkylene polyol to reactively support the carrier solvent/reactant(s).

These components, in stoichiometrically balanced volume ratios, provide wood preservative formulations with a range of material characteristics ably suited for various wood preservation requirements. The sequential mixing process is normally done at ambient conditions of 70–80 Fahrenheit, about 750–760 mm Hg, and relative humidity of 50–65%.

The formulations of these components to obtain a urea-linked polyurethane/urea co-polymer is governed by the well-principled science of stoichiometric chemistry. Stoichiometric chemistry mix requirements for compatible polymeter components of various average molecular weight and various NCO % content are well know and practiced by those skilled in the science of polymer chemistry.

Suitable materials for each of these classifications are discussed below, followed by a description of the suspected mechanics underlying the delayed polymerization exhibited by the present invention. Following a discussion of the mechanics of the present invention as a termicide, specific examples of commercially available suitable components are then listed, as are examples detailing actual experimental results.

Diamines

The oligomeric blend of diamines developed for the present invention consists of a primary diamine and a secondary diamine. The amine functionality is capped onto the ends of the soft segment. Chain extension, or polymerization, is accomplished by using MDI, modified forms of monomeric MDI, or MDI containing resins as the hard segments. Elastomers prepared from such generic formulations exhibit the best overall physical properties of liquid-phase cast elastomers, although other soft segments can be used—polyether, polyester, polycarbonate, or polypropylene glycol. TDI-amine elastomers contain urethane and urea linkages, while MDI-polyol elastomers contain only urethane linkages. MDI-amine elastomers contain only polyureathane/urea linkages.

Isocyanates

A suitable polyisocyanate for use in the polymer chemistry system of the present invention is one that is conventionally employed in the production of polyurethanes.

Examples of monomeric polyisocyanates useful herein include polyisocyanates and polyisothiocyanates which are PAPI-1 (a polyaryl polyisocyanate as defined in U.S. Pat. No. 2,683,730), tolylene diisocyanate "TDI", triphenylmethane-4,4'4"-triisocyanate, benzene-1,3,5-triisocyanate, toluene-2,4,6-triisocyanate, diphenyl-2,4,4'-triisocyanate, hexamethylene diisocyanate, xylylene diisocyahate, chlorophenylene diisocyanate, diphenylmethane-4,4'-diisocyanate, naphthalene-I,5-diisocyanate, xylene-alpha, alpha'-diisothiocyanate, 3,3'-dimethyl-4,4'biphenylene diisocyanate, 3-3'dimethoxy-4,4'-biphenylene diisocyanate, 2',3,3'-dimethyl-4,4'-biphenylene diisocyanate, 5,5'-tetramethyl-4,4'biphenylene diisocyanate, 2,2',5,5'-tetramethyl-4,4'biphenylene diisocyanate, 4,4'methylenebis(phenylisocyanate), 4,4'-sulfonylbis(phenylisocyanate), 4,4'-methylene di-orthototylisocyanate, ethylene diisocyanate, ethylene diisothiocyanate, trimethylenediisocyanate and the like. Mixtures of any one or more of the above mentioned organic isothiocyanates or isocyanates may be used as desired.

Additionally suitable are mixtures of TDI such as a mixture (80/20 by weight) of 2.4-toluene diisocyanate and 2,6 toluene diisocyanate or a mixture (65/35 by weight) of 2,4-toluene diisocyanate and 2,6-toluene diisocyanate; tetramethylene diisocyanate; hexamethylene diisocyanate; xylene diisocyanate; 1,5-na.pththylene diisocyanate; 1,4-phenylene diisocyanate; 4,4'-'diphenylmethane diisocyanate (MDI) (Upjohn's ISONATE® 125M); 4,4'4"-triphenylmethane triisocyanate; and 3,3'-dimethyl-4.4'-diphenylmethane diisocyanate. Aliphatic diisocyanates such as the $C_{36}$ aliphatic diisocyanate derived from the dimer of ricinoleic acid can be suitably employed and are commercially available, for example, as DDI-1410 (Henkel Corporation, Resin Division, Minneapolis. Minn.). The polyisocyanates hereof are known polyisocyanates in the field of polyurethane technology and can be employed singly or in admixture. Other examples of such polyisocyanates can be found, for example, in *The Development and Use of Polyurethane Products*, E. N. Doyle, McGraw-Hill Book Company, page 27 (1971) and *Polyurethane Handbook*, Gunter Oertel Hauser. Gardner Press (1994).

Preferred polyisocyanates for employment in the process of the present invention are polyisocyanate materials in a liquid form at ambient temperatures, e.g. a liquid MDI product as disclosed in U.S. Pat. No. 3,394,164. These materials facilitate the production of polymeric products from normally liquid oligomeric aminobenzoic acid esters or amides and obviate the requirement of melting a solid polyisocyanate as a prerequisite to providing a suitable reaction mixture. Suitable liquid polyisocyanate materials are known and include, for example, polymeric MDI (4,4'-diphenylmethane diisocyanate) products obtained as by-products from the synthesis of MDI.

In the production of MDI by the condensation of aniline with formaldehyde and the conversion of amino to corresponding isocyanate groups, a content of the initially formed bis-adduct of aniline and formaldehyde reacts further with the reaction mixture to form polymeric aniline derivatives which are in turn converted to isocyanates. Typically, such polymeric derivatives will have a functionality of from about 4 to about 15, for example, about 10 isocyanate groups per molecule. Products containing such polymeric polyiscocyanates in the form of a pot residue after removal of pure MDI by distillation can be utilized. Similarly, polyisocyanate products comprising such polymeric polyisocyanate species in admixture with pure MDI, i.e., the undistilled reaction mixture, can be employed. Polymeric MDI products can be employed herein to advantage and are commercially available under such trade designations as RURBINATE® M, RURBINATE® LF-168 and RURBINATE® LF-209 (available from Rubicon Chemicals Inc. Geisman. La.) and PaPI 27, PaPI 135, PaPI 580 and PaPI 901 (available from the Upjohn Company, Kalamazoo, Mich.).

Another liquid polyisocyanate material which can be employed where crosslinking is desirably introduced into the polymeric products hereof comprises an admixture of MDI and a tri-functional cycloaddition product of MDI. An admixture of MDI and a trifunctional cycloadduct having the following structure, where R is can be employed:

Such an admixture is available under the designation "Liquid MDI, Isonate 143L" (The Upjohn Company, Kalamazoo) Mich.).

To reiterate, in addition to the preferred MDI, modified forms of monomeric MDI or MDI-containing resins, any suitable organic diisocyanate may be used in the process of this invention such as, for example, aliphatic diisocyanates, aromatic diisocyanates, alicyclic diisocyanates, and heterocyclic diisocyanates including such as, for example, ethylene diisocyanate, ethylidene diisocyanate, propylene diisocyanate, butylene diisocyanate. cyclopentylene-1,3-diisocyanate, cyclohexylene-I,4-diisocyanate, cyclohexylene-1,2.diisocyanate, 2,4-tolylene diisocyanate, 2,6-tolylene diisocyanate, 4,4'-diphenylmethane diisocyanate, 2,2-diphenylpropane-4,4'-diisocyanate, p-phenylene diisocyanate, m-phenylene 15 diisocyanate, xylylene diisocyanate, 1,4-napthylene diisocyanate, 1,5-naphthylene diisocyanate, diphenyl-4,4'diisocyanate, azobenzene-4,4'-diisocyanate, diphenylsulfone-4,4'-diisocyanate, dichloro-hexamethylene diisocyanate, tetramethylene diisocyanate, pentametylene diisocyanate, hexamethylene diilsocyanate, 1-chlorobenzene-2,4-diisocyanate, furfurylidene diisocyanate, triphenyl methane triisocyanate and the like.

Other examples of suitable organic diisocyanates include 1,4-tetramethylene diisocyanate, 1,6-hexamethylene diisocyanate, 2,2,4-trimethyl-1.6-hexamethylene diisocyanate, 1,12-dodecamethylene diisocyanate, cyclohexane-1,3-and-1,4-diisocyanate, 1-isocyanato-2-isocyanatomethyl cyclopentane, 1-isocyanato-3-isocyanatomethyl-3,5,5-trimethylcyclohexane(isophorone diisocyanate or IPDI), bis-(4-isocyanatocyclohexyl)-methane, 2,4'dicyclohexyl-methane diisocyanate, 1,3- and 1,4-bis(isocyanatomethyl)-cyclohexane, bis-(4-isocyanato-3-methyl-cyclohexyl)-methane,α,α,α',α'-tetramethyl-1,3-1-isocyanato-1-methyl-4(3)-isocyanatomethyl cyclohexane, 2,4-, 1,3- and/or 1,4-phenylene diisocyanate, 2,4- and/or 2,6-toluylene diisocyanate, 2,4- and/or 4,4'-diphenyl-methane diisocyanate, 1,5-diisocyanato naphthalene and mixtures thereof. Aromatic polyisocyanates containing 3 or more isocyanate groups such as 4,4',4"-triphenylmethane diisocyanate.

In accordance with the present invention, the polyisocyanate component can be in the form of an NCO prepolymer or a polyisocyanate adduct, more preferably a polyisocyanate adduct. Suitable polyisocyanate adducts are those containing, isocyanurate, uretdione, biuret, urethane, allophanate, carbodiimide and/or oxadiazinetrione groups. The polyisocyanates adducts have an average functionality of 2 to 6 and an NCO content of 5 to 30% by weight. The isocyanato-isocyanurateg generally have an average NCO functionality of 3 to 3.5 and an NCO content of 5 to 30%, preferably 10 to 25% and most preferably 15 to 25% by weight.

Preferred polyisocyanate adducts are the polyisocyanates containing isocyanurate groups, biuret groups or mixtures of isocyanurate and allophanate groups.

The NCO prepolymers, which may also be used as the polyisocyanate component in accordance with the present invention, are prepared from the previously described monomeric polyisocyanates or polyisocyanate adducts, preferably monomeric diisocyanates, and organic compounds containing at least two isocyanate-reactive groups, preferably at least two hydroxy groups. These organic compounds include high molecular weight compounds having molecular weights of 400 to about 6,000, preferably 800 to about 3,000, and optionally low molecular weight compounds with molecular weights below 400. The molecular weights are number average molecular weights (Mn) and are determined by end group analysis (OH number).

With regard to the organic diisocyanates, the prepolymers and the polyisocyanate adducts, reference is made to U.S. Pat. No. 5,516,873, which is incorporated by reference hereinto in its entirety.

Carrier Solvent/Reactants

A suitable stabilizing carrier is one which will completely dissolve the selected aromatic diamine derivative and the selected polyisocyanate when they are combined to form a reaction solution but which will prevent the resultant polymeric reaction product, i.e. the polyurea, from solidifying or gelling out of the reaction solution. In other words, the stabilizing carrier either prevents the normally near instantaneous reaction between the isocyanate group and the amino group or prevents the resultant reaction product, e.g. polyurea, from solidifying or gelling until such time as a portion of the stabilizing carrier or solvent is removed from the resultant solution, e.g., as by evaporation.

A suitable stabilizing carrier comprises a stabilizing solvent selected from:

(a) an aldehyde or ketone of the formula where $R_4$ and $R_5$ are independently of each other hydrogen and lower alkyl or $R_4$ and $R_5$ are joined to form a five or six membered ring; where the term "lower" is as previously defined; and where the term "alkyl" is as previously defined;

(b) an ester having the formula where $R_6$ and $R_7$ are loweralkyl (as previously defined) and $R_7$ additionally is H and loweralkoxy where the term "lower" is as previously defined and the term "alkoxy" is as previously defined;

(c) ortho, meta- or para-dimethylbenzene;

(d) N-methylpyrrolidone;

(e) Solvesso solvent;

(f) a petroleum hydrocarbon;
(g) a lactone of the formula where "lower" and "alkylene" is as previously defined; such as y-butyrolactone; and
a mixture of any of the foregeoing solvents; combined with at least one polyol of the formula HO-loweralkylene-OH where "lower" and "alkylene" is as previously defined.

Some suitable aldehydes and ketones, for example, include acetone, methyl ethyl ketone, methylisobutylketone, N-methylcyclohexanone, acetaldehyde, propionaldehyde, butryaldehyde and isobutyraldehyde. Some suitable solvents of formula (b) include methyl acetate, ethyl acetate, butyl acetate, and methoxy propyl acetate. Some suitable polyols include, for example, polyglyols of the formula (10)

where p is an integer equal to 1 to 14, as for example when p is equal to 1 to 3, such compounds as ethylene glycol, propylene glycol, butylene glycols, such as 1,3-, 1,4-, and 2-3-butylene glycol, and alkylene glycols having 5 to 9 carbon atoms; when n is 4 or greater, polyglycols of an average molecular weight of about 600, such as polyethylene glycol 200, polyethylene glycol 400 and polyethylene glycol 600. It is to be understood that a mixture of the stabilizing solvents, e.g. aldehydes and ketones, can be employed, as well as a mixture of polyols, e.g., a mixture of ethylene glycol and propylene glycol.

The selected aromatic diamine derivative and the selected polyisocyanate components are added to the stabilizing carrier solution to form a reaction solution. Conventionally, these reaction components are combined in the stabilizing carrier in solution in substantially equivalent proportions, that is in amount of the polyisocyanate of about 0.9 to 1.2 equivalents per equivalent of the first component of oligomeric aromatic diamine derivative, based upon the isocyanate groups and amino groups, respectively, of the polyisocyanate and oligomeric diamine derivative reactants, Typically, from about 1.0 to about 1.15 equivalent of polyisocyanate material per equivalent of the first component e.g., diamine derivative is employed.

Preferably, the primary reactants, e.g. oligometrice diamine derivative, and the polyisocyanate are combined in a volume ratio whereby the isocyanate is in excess to the ester or amide or diamine and is expressed in the following manner:

which gives the parts of the polyisocyanate per 100 parts of the first reactant e.g. the oligomeric diamine derivatives.

The amount of carrier agent employed is one which is sufficient to dissolve the first reactants e.g. the oligomeric diamine derivatives, and the polyisocyanate second reactant and maintain the reaction product thereof, i.e., the polyurea, in solution without the precipitation out or gelling of the polyurea product. Typically, the amount of stabilizing carrier employed is about 10 to 80% of the total reaction solution volume. Typically the amount of the stabilizing solvent, e.g. aldehyde and/or ketone, employed with at least one polyol is in the ratio of 10 to 80 parts of solvent to one part of polyol. The amount of stabilizing solvent, e.g. acetone, is adjusted depending upon the viscosity desired for specific application requirements, e.g. for maximum penetration and an ultrathin coating thickness for glass, plumbing fixtures, furniture coatings, to a heavy gauge coating thickness for substrates having heavy chemical or environmental corrosion exposure. Typically, the reaction product viscosity will range from about 3.5 centipoise to about 1800 centipoise at room temperature.

The oligomeric diamines in the stabilizing carrier typically react with the polyisocyanate at room temperature; however, the reaction solution can be heated to affect reaction.

The resultant reaction solution is a 'single pot' polyurea composition that can be stored for a long period of time, e.g. 6–9 months at 25° C. without exhibiting any instability or gelling out of the polyurea. Accordingly, this single pot composition can be applied in any manner for a synthetic polymer process, e.g., casting, molding, spraying, etc., where, after application, the single pot composition is treated, e.g. by heating, vacuum evaporation, etc., to remove at least a portion of the stabilizing carrier, leading to the formation of a solid, cured polyurea material.

Additives

While the process and the single pot formulation permits the production of polymeric materials without the use of blocking agents, end-capping chemical modifications or thermally activated catalysts, e.g. caprolactum, B-carbonyl compounds (such as ethyl aceto acetate, ethyl malonate), alcohols and oximes; polymerization additives of various types employed in the manufacture of polymeric products can desirably be employed. For example, such polymerization agents as catalysts, ultraviolet absorbers, fillers, plasticizers, blowing agents, etc., can be employed where desired.

Typically a flow and leveling agent polymerization additive is employed. Preferably such additive comprises a glycidyl-ester of neo decanoic acid, of the formula where the $R_{10}$, $R_{11}$, $R_{12}$ are independently of each other H and lower alkyl where the sum of each alkyl group of $R_{10}$, $R_{11}$, and $R_{12}$ does not exceed 8 carbon atoms.

Other flow and leveling agents include the diglycidyl either of 1.4-butane diol, the diglycidyl ether of neopentyl glycol, the poliglycidyl ether of aliphatic polyols, phenyl glycidyl ether, nonyl phenyl glycidyl ether, $C_9$–$C_{18}$ glycidyl ether of castor oil, trimethyol ethane of triglycidyl ether and the ester forms of the aforementioned ethers. These ethers and esters are commercially available from the Shell Chemical Company and are designated as HELOXY. The glycidyl neodecanoate is commercially available from Exxon Chemical Company and is known as GLYDEXX N-10.

Additionally, employed is an ultraviolet (UV) light absorber such as benzotriazoles, e.g. benzotriazoles revealed in U.S. Pat. Nos. 3,004,896 and 3.189,615. Such benzotriazoles are commercially available from Ciba Geigy as Tinuyin® products, such as Tinuvin® P, (2-(2H-benzotriazol-2yl))-4-methylphenol); Tinuvin® 1130, comprising about fifty-two weight percent of poly{oxy-1,2-ethanediyl), α-(3-(3-(2H-benzotriazol-2-yl)-5-(1,1-imethylethyl)-4-hydroxyphenyl)-oxopropyl)-ω-hydroxy, of the formula having an average molecular weight of 637, about thirty-five weight percent of poly(oxy-1,2-ethanedlyl), α-(3-(3-(2H-benzotriazol-2-yl)-5-(1,1-dimethylethyl)-4-hydroxyphenyl)-1-oxopropyl-ω-(3-(3-2H-benzotrazol-2-yl)-5-(1,1-diamethylethyl)-4-hydroxyphenyl)-I-oxopropyoxy), of the formula having an average molecular weight of 975, and the remainder (about thirteen weight percent of polyethylene glycol (300 molecular weight), which is used to functionalize the Tinuvin® 1130; Tinuvin® 292 and Tinuvin® 328, [2-(2'-hydroxyl-3,5'-di-tert -amylphenyl)benzotriazole].

Finally, an antioxidant is employed. A preferred antioxidant is 3,5-di-tert-butyl-hydroxycinnamate, known as IRGANOX 1076, commercially available from Ciba Geigy.

A preferred UV stabilizer/antioxidant additive composition comprises about 70–75 weight percent of Tinuvin® 1130, 10–15 weight percent IRGANOX 1076 and 10–20 weight percent of Tinuvin® 328.

The concentration of the additives, e.g. UV stabilizer, antioxidant, leveling agent, etc. of the total formulation will, of course, depend upon the desired use of the formulation and will be varied accordingly in a manner well known to those skilled in the art. Typically, where the reactants are HUNTSMAN D-2000 and ISONATE® 2143L or BAS7 218, the carrier solvent is acetone and the leveling agent GLYDDEX® N-10 is employed, the polyol component of the stabilizing carrier in the reaction solution and the FORMULATION is present in an amount which is in the ratio of the oligomeric diamine derivatives to the polyol of 5 to 2.66 to 1, preferably between 4.25 and 1.75 to 1, and, most preferably 4.0 to 1.

If a mixture of polyols is employed, e.g., ethylene glycol and propylene glycol, each polyol preferably should be present in equal amounts. If each polyol of the mixture of polyols is not present in equal amounts in making up the ratio of diamine to polyol, then the cure time and storage time will vary. For example, where a mixture of ethylene glycol ("EG") and propylene glycol ("PPG") is 30 emploed and the ratio of EG/ISONATE® 2143L to PPG/ISONATE® 2143L ("RATIO") is greater than 1, then the following cure times are 31 obtained:

| RATIO | CURE TIME (25°) |
|-------|-----------------|
| 1.0   | 1.5–2 hours     |
| 1.25  | 6–7 hours       |
| 2.0   | 28–32 hours     |

Additionally, typically, the ratio of N-10/218 is equal to or less than the ratio of EG+PPG/218. If it is greater, then the dry times of the coatings resulting from the reaction solution are lengthened. When the ratio is less than 1, the flow and spreadability of the reaction solution is reduced. The ratio range is typically 0.72 to 1.3, preferably 0.85 to 1.15, and most preferably 1.0 for N-10/218 to EG+PPG/218.

Finally, the ratio of EG+N-10/2143L to PPG+N-10/2143L is typically 1, whereby an optimum drying time of about 45 minutes to one hour and fifteen minutes at 25° C. is obtained. Ratios of less than or more than 1 typically produce reaction solutions with proportionate increases in drying times.

Another ratio which is considered is the ratio of EG/N-10 and PPG/N-10 which typically are equal to each other as well as equal to twice that of (EG+PPG)/2143L. Typically, the ratio of EG/N-10 to PPG/N-10 is 0.8 to 1.42, preferably 0.92 to 1.2 and most preferably 1.0.

Mechanics of Suspended Polymerization

It is hypothesized that the resultant single pot polyurea formulation having a very long shelf life without any solidification or gelling of the polyurea, e.g., 9 to 12 months at a temperature of 5 to 45° C., is due to an in situ ionic shielding action. This ionic shielding action is only a hypothesis and is not to be a limiting factor of the subject invention. The in situ ionic shielding action is hypothesized to be obtained by the reaction of the stabilizing solvent, e.g., acetone, and the polyol, e.g., a mixture of ethylene glycol and propylene glycol. This in situ reaction and its continued maintenance while in a sealed and lidded container is believed to be the electrochemical basis for being able to provide a single pot, polyurea based, elastomer polymer composition having long term shelf life, with constant clarity, fluidity and drying time factors. It is hypothesized that the reaction between the stabilizing solvent, e.g. acetone, and the polyol, e.g., a mixture of ethylene glycol and propylene glycol, produces an excess of hydrogen ions which interact with the primary amine groups of the oligomeric aromatic diamine derivative, thereby preventing reaction thereof with the polyisocyanate until a portion of the stabilizing carrier is removed, e.g., by evaporation. The basis of this belief is presented below.

If the reaction rate depends on electrophilic (i.e., electron seeking) attack on the aromatic ring, then substituents that withdraw electrons from the ring will decrease electron density in the ring—and therefore slow down the reaction. Conversely, substituents that donate electrons will speed up the reaction. This reactivity pattern is observed with all electrophilic aromatic substitution reactions.

Glycols—Ethylene and Propylene (DIOLS)

Alcohols are weak acids. The hydroxyl group can act as a proton donor:

Essentially, donating protons is equivalent to withdrawing electrons, corresponding to reactivity reduction.

and acetone:

producing a +hydrogen ion, while at the same time eliminating the C=O double bond in acetone. It is also reasonable to assume that the constituent reactivity of ethylene glycol is considerably greater –insofar as providing +H ions in acetone, an acceptor solvent. In similar manner, the reaction of constituent propylene glycol behaves in an analogous fashion.

The reactivity of the —N=C=O— group is mainly determined by the pronounced positive (+) character of the C-atom in the cumulative double-bond sequence consisting of nitrogen, carbon, and oxygen. The positive charge at the C-atom becomes obvious if one looks at the resonance structure, which also indicates how substituents at the radical which bears the NCO group can influence this reactivity.

The portion of the formula to the right-hand side of the dashed line represents the elimination of the C=O double bond in the acetone molecule. Acetone-ethylene glycol ketal can be presented as a cyclic aromatic hydrocarbon.

In reactions in which a constituent is a particular solvent (primarily for viscosity purposes) substrates (solvents) that donate electrons are called donor solvents, while substrates that extract electrons are called acceptor solvents. Resonance effects being equal, the reactivity of a donor radical will always be greater with an acceptor solvent than with a donor solvent. Acetone is classified as an acceptor solvent If one applies the action of donor and acceptor solvents, one can understand the cause of the reaction between ethylene glycol:

The negative charge can be delocalized, or transferred in R, if R stands for an aromatic radical.

Substituents on the aromatic ring show the known influences on the positive character of the NCO group. To wit, electron-withdrawing substituents in PARA- or ORTHO-positions increase the reactivity of the NCO-group, and electron-donating substituents lower the reactivity of the NCO group.

At this point, the following possible inhibition mechanism, or equilibrium reaction, is to be considered as a likely—and most reasonable—explanation, based on all previous stated facts.

Fact 1. The reaction of the solvent acetone with both ethylene glycol and propylene glycol:

produces an excess of $H^+$ ions.

Fact 2. The mobility of these reaction $H^+$ ions is approximately $10^3 \times$ greater than the mobility of the NCO groups in the same common solvent—acetone.

Fact 3. The R radical of P-1000 (also P-250 and P-650) is the primary amine located at both ends of the oligomeric backbone diamine. See FIG. 2. Note that electrophilic substitution (and resonant replacement) is a predominant feature of reactions with benzene and delocalized π (pi) electrons on the benzene ring.

Fact 4. As discussed above, a negative charge can be delocalized or transferred in an aromatic radical. The primary amine, being an aromatic radical, bears a delocalized negative (−) change, which in terms of the order of magnitude (×3) of the glycols-acetone reaction, effectively neutralizes the negative (−) charged radicals in a manner so effective as to virtually reduce to zero the positive charge affinity of the carbon atom in the NCO group to react with the delocalized negative charge on the aromatic radical, the primary amine, principally because of the vast difference in solvent mobility. In other words, the highly mobile $H^+$ ions literally "lock-up" the amine radicals well before the virtually immobile NCO-group molecules can find any un-neutralized negative (−) radicals.

Fact 5. When the 1-part mix is applied as a coating, sealant, caulking, preservative, etc., the rapid evaporation of the acetone terminates the $H^+$ ion reaction of the liquid acetone/glycols, leaving in solution primarily the oligomeric diamine/NCO reactants. In this condition—acetone removed by evaporation—the NCO/oligomeric diamine constituents experience initiation of polymerization, and continue until completely polymerized into a polyurea elastomer.

Fact 6. Hydrodynamic volume-solvent effects and molecular weight analysis. Once a polymer-solvent system has been selected, another consideration is how the polymer molecules behave in that solvent. Particularly important from the standpoint of molecular weight determinations is the resultant size, or hydrodynamic volume, of the polymer molecules in solution.

Assuming that polymer molecules of a given molecular weight are fully separated from one another by solvent, the hydrodynamic volume will depend on a variety of factors, including A) Interactions between solvent and polymer molecules;
B) chain branching;
C) conformation effects arising from the polarity and steric bulk of the substituent groups; and
D) restricted rotation caused by resonance, for example, of the type common to polyamides and polyamines:

Because of Brownian motion, molecules are changing shape continuously. Therefore, any method of trying to predict molecular size (and subsequently molecular weight) must necessarily be based on statistical methods and average dimensions. If a molecule were fully extended, its size could easily be computed from knowledge of bond lengths and bond angles. Such is not the case, however, with most polymers. Because of this lack of exact knowledge of bond lengths and bond angles, size is generally expressed in terms of the following. For a linear polymer, $r^2$=mean square average distance between chain ends. For a branched polymer, $s^2$=square average radius of gyration about the center of gravity.

Figure 1:
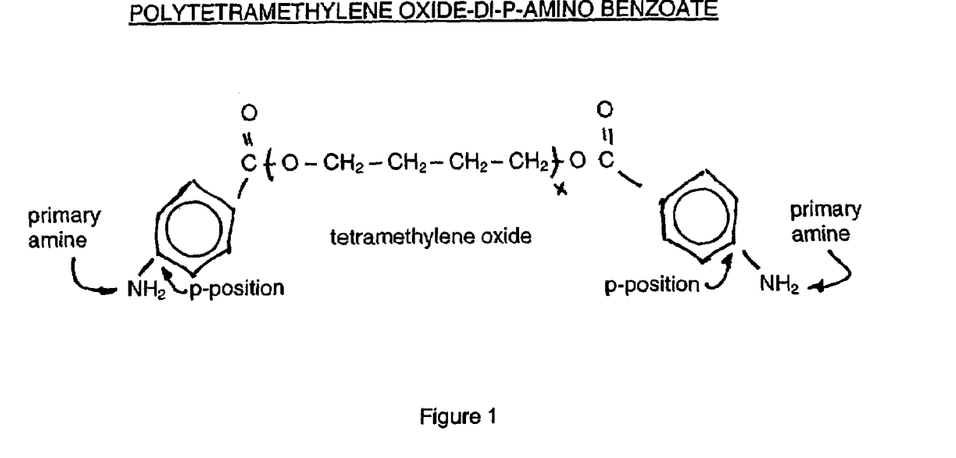
FIG. 1 an a schematic illustrating a polyurethane/urea polymer in accordance with one embodiment of the present invention.
Figure 2:
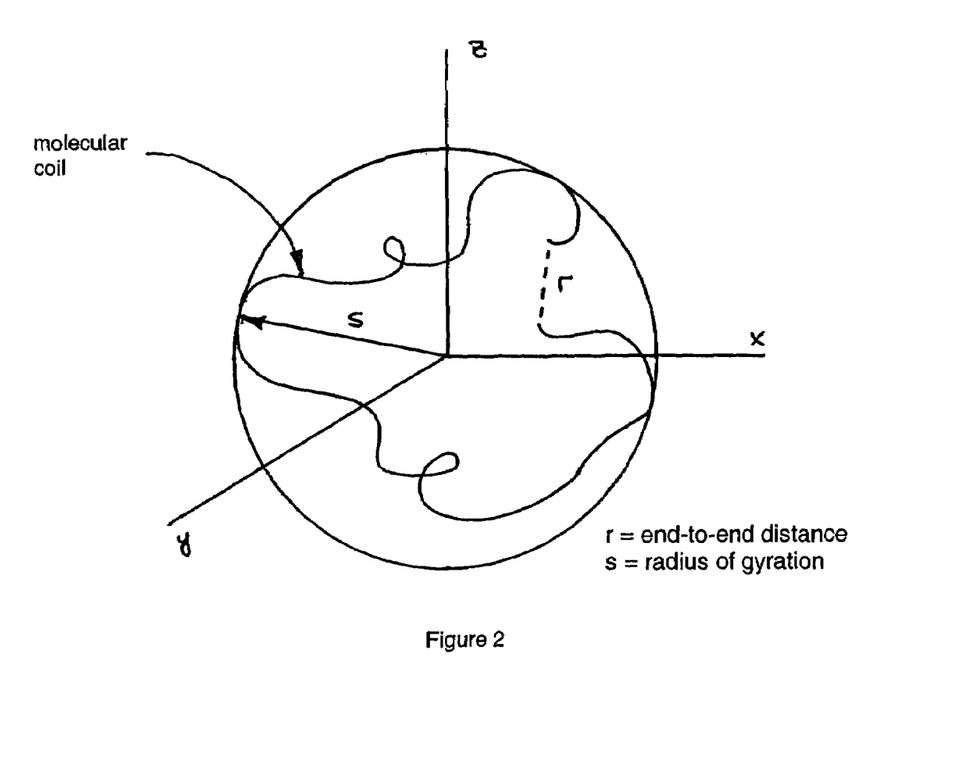
FIG. 2 is a schematic illustrating a coiled structure of an individual polymer molecule in accordance with one embodiment of the present invention.

FIG. 2 illustrates the meaning of r and s from the perspective of a coiled structure of an individual polymer molecule having its center of gravity at the origin. The average shape of the coiled molecule is spherical. The greater the affinity of solvent for polymer, the greater the size of the sphere, or, in corollary fashion, the greater the value of s. That is, the greater the affinity of solvent for polymer, the greater the size of the sphere, i.e., the hydrodynamic volume. When solvent-polymer integration decreases, intramolecular interactions become more important, leading to hydrodynamic volume contraction.

In order to discuss the quantitative aspects of hydrodynamic volume parameters as related to solvent-polymer interaction, it is appropriate to define terms. Both r and s must be defined in terms of two factors:

A) $r_o$ and $s_o$: an unperturbed dimension; and
B) α: a volume expansion factor.

These definitions permit the following relations:

$$r^2 = r_0^2 \alpha^2$$

$$s^2 = s_0^2 \alpha^2$$

The unperturbed dimensions, $r_o$ and $s_o$, refer to the size of the macromolecule, exclusive of solvent effects. It is established from a combination of free rotation and intramolecular steric(?) and polar interaction. The expansion factor α is defined in terms of interactions between solvent and polymer. For a linear polymer, $r^2$=6 $s^2$.

Since $$\alpha = \frac{(r^2)^{1/2}}{(r_0^2)^{1/2}}$$

it is a conclusion that α will be >1 in a "good solvent" and the actual perturbed dimensions, r and s, will both have larger values than their corresponding "unperturbed" dimension values. The greater the value of α for a particular solvent-polymer combination, the "better" the solvent. For the special case where α=1, the polymer assumes its "unperturbed" dimensions, and behaves as an "ideal" statistical coil.

Since solubility properties vary with temperature in a given solvent, α is temperature dependent. For a specific polymer in a specific solvent, the lowest temperature at which α=1 is coiled the theta (θ) temperature, (or flory temp.) and that solvent is then called a theta solvent. Additionally the polymer is said to be in a theta state. It is usual to define the theta of a polymer as that state in which the polymer is on the brink of becoming insoluble.

The Present Invention as a Termicide

Biologically, all organisms require an available, reasonably constant source of nutrition to stay alive. For termites, the symbiotic gut-inhabiting protozoa enable the termite to digest cellulose. The influence of the gut-inhabiting protozoa is a critical aspect of termite feeding behavior. The species and numbers of the protozoa and other micro-organisms present in the termite primarily determine the enzyme content of the termite gut, which, in turn, determines the material that can be digested, or detoxified. Based on this biological principle, a polymer-based chemistry system has been developed which, when used as a wood-preservative impregnation, results in a polymerized polyurethane/urea solid-state polymer which has permeated the entire lignocellulose fiber structure of the wood. This polyurethane/urea polymer has been computer analyzed for its resistance to the gut-inhabiting protozoa and digestive enzymes of the native, widely spread, subterranean termite, RETICULITERMES FLAVIPES. Numerous analyses have verified, with a high degree of certainty, that this particular polyurethane/urea polymer is inert to the protozoa and digestive enzymes inhabiting the gut of this class of termites. Since the cellulose fiber is permeated with the preservative polymer, continued feeding action of the termites results in an accumulation of inert, undigested, polymer saturated cellulose which is incapable of supplying the nutrition requirements of the termite for survival. In addition, this inability to digest results in a termite gut progressively filling with inedible material, grossly affecting normal metabolism functions—and, in a period of 6–8 weeks—resulting in terminal mortality.

This termicidal capability of the invention described herein is one of the novel features of this invention. It is essentially an external source termicide inherent in the composition of the invention, not relying on toxic chemicals or specious wood extractives as a component of the formulations herein described.

Specific Formulations

The preferred elastomers for the practice of the present invention are obtained by formula ratio variations (i.e., stoichiometrically balanced) of the presently used components; these components, and their chemical description and function are described as:

1) Primary Diamine
  a) Manufactured by Huntsman Chemicals, Inc., Houston, Tex.
  b) Chemical family. CAS #9046-10-0-Polyoxypropylene diamine
  c) Description/Use: Difunctional Primary Amine Polymer chain extender (Chemical Intermediate)
  d) Features: Low viscosity, low vapor pressure, broad solvent range
  e) Commercial name: D-2000
2) Secondary diamine
  a) Manufactured by UOP, Des Plaines) IL
  b) Chemical family. CAS #5285-60-9-N, N1-Dialkylamino-Diphenylmethane
  c) Description/Use: Secondary diamine—Polymer-chain Extender
  d) Features: Armine-cured MDI Prepolymers, low moisture sensitivity, selective cross-linking
  e) Commercial name; UOP-4200, Unilink 4200
3) Modified Diphenylmethane Diisocyanate
  a) Source: Huntsman Chemicals, Houston, Tex.
  b) Chemical family: CAS. No. 26447-40-5
  c) Product name: Rubinate 9433
  d) Description/Use: Polymer chain extension
  e) Formula description: Modified MDI
  f) Features: Low viscosity, low vapor pressure
4) Modified Polyether Polyol
  a) Source: Bayer Corp, Pittsburgh, Pa.
  b) Chemical family: CAS. No.25723-16-4—Propylene oxide adduct of trimethylol propane
  c) Description/use: MDI-activated thermoset—polymer converter
  d) Formula: 1,2,3-tris(hydroxymethyl)propane.
  e) Features: Low viscosity, low vapor pressure, elastomeric thermoset polymer conversion
5) Acetone, aka Propanone-Primary Solvent Carrier/Reactant
  a) Available from numerous chemical distributors
  b) Chemical family: CAS. #67-64-1 Propanone, Acetone,
  c) Description/use: Solvent carrier/reactant
  d) Features: Low viscosity, low vapor pressure, and ability to react with ammonia (diamine) pre-polymer end caps to give Diacetonamine
6) Mineral Spirits. Secondary Solvent Carrier/Reactant
  a) Available from numerous chemical distributors
  b) Chemical family: CAS #8052-41-3
  c) Description/use: Secondary carrier solvent/reactant
  d) Formula: Stoddard Standard
  e) Features: Low viscosity, low vapor pressure, enables required viscosity values

BASIC FORMULATIONS—EXAMPLES

The following representative examples summarize the procedures and results obtained from the practice of four embodiments of the present invention. All procedures were performed at ambient conditions of 70–80 degrees F., 750–760 mm. Hg atmospheric pressure, and 50–65% relative humidity. All component amounts are identified in terms of stoichiometrically balanced volume amounts expressed as milliliters.

Example #1

Formulation #1

Liquid thermosetting, hydrophobic, elastomeric, non-toxic polyurethane/urea polymer solution was prepared as generally described in Example No. 1, using the following reactants:

| Reagent | Volume | | Stoichiometric Volume Ratio |
|---|---|---|---|
| 1) Acetone | 116 ml. | | 0.810 |
| 2) Primary diamine D-2000 | 12 ml. | | 0.084 |
| 3) Secondary diamine UOP 4200 | 3.0 ml. | | 0.02T |
| 4) Poly (oxyalkylene) polyol Multranol 4012 | 6.0 ml. | | 0.042 |
| 5) Diphenylmethane diisocyanate Rubinate 9433 | 6.2 ml. | | 0.043 |
| | 143.20 ml. | Tot. Vol. | 1.000 |

Solution was stirred in same manner as Example No. 1.

Procedure

1) Solution was stir-blended constantly at 20 paddle revolutions per minute during the sequential addition of the ingredients, and for 15–20 minutes after addition of last ingredient, namely the diisocyanate. The parameters of the stir-blending process, in terms of revolutions and time, are the most optimum for obtaining maximum sequential reactivity of the ingredients during blending.

2) Standard wooden tongue depressors were used to obtain comparative values of a) tack-free dry-time and b) water absorption, three hours after a five minute sample dip immersion exposure to impregnation.

3) Results:
a) tack-free dry-time, 30–40 seconds;
b) water absorption after one hour exposure—less than 0.01%

4) Primary use: Low viscosity liquid for enabling complete preservation impregnation of dense low porosity wood grains. e.g., spruce, fir, maple, walnut and mahogany.

Example #2

Formulation #2

Liquid thermosetting, hydrophobic, elastomeric, non-toxic polyureathane/urea polymer solution was prepared as generally described in Example No. 1, using the following reactants:

| Reagent | Volume | Stoichiometric Volume Ratio |
|---|---|---|
| 1) Acetone | 116 ml. | 0.810 |
| 2) Primary diamine D-2000 | 12 ml. | 0.084 |
| 3) Secondary diamine UOP 4200 | 3.0 ml. | 0.02T |
| 4) Poly (oxyalkylene) polyol Multranol 4012 | 6.0 ml. | 0.042 |
| 5) Diphenylmethane diisocyanate Rubinate 9433 | 6.2 ml. | 0.043 |
| | 143.20 ml. Tot. Vol. | 1.000 |

Solution was stirred in same manner as Example No. 1.
Results:
1) approximately a 20% viscosity increase, with respect to Example No. 1
2) test stick—dip tack free dry time: 4–5 minutes
3) water absorption—three hours after impregnation: less than 0.005%

Primary intended use: Moderate viscosity liquid for enabling complete impregnation preservation of porous grain woods, e.g., Southern yellow pine, oak, poplar, birch.

Example #3

Formulation #3

The preparation procedure of Example No. 1 was repeated under the following conditions:

| Reagent | Volume | Stoichiometric Volume Ratio |
|---|---|---|
| 1) Acetone | 150 mls | 0.664 |
| 2) Mineral spirits | 60 mls | 0.265 |
| 3) Primary diamine D-2000 | 10.80 mls | 0.048 |
| 4) Secondary diamine UOP 4200 | 2.0 mls | 0.009 |
| 5) Diphenylmethane diisocyanate Rubinate 9433 | 3.2 mls | 0.014 |
| | 226.0 mls total | 1.000 |

Results:
a) Tack-free dry-time—15–20 minutes
b) Water absorption—exposure one hour, less than 0.01%

Primary intended use: Low viscosity, high penetration liquid polymer solution for application as a hydrophobic surface sealant on old CCA-treated wood for the prevention of toxic leaching when surface exposed to environmental water conditions, e.g., rain, snow, or excessive humidity.

The polymer chemistry-based formulations of the present invention for use as wood preservatives and preservation exhibit many desirable properties and characteristics. They are non-toxic; non-human carcinogenic; hydrophobic; elastomeric; termicidal; and chemically and structurally incapable of preservative leaching. The formulations are non-water based; resistant to solar ultraviolet exposure degradation; and exhibit a non-degraded, long-term effective elastomeric thermal stress response over a tested range of −80 degrees F to +225 degrees F. The polymer chemistry-based wood preservative formulations are chemically classified as a polyurethane/urea cross-linked polymer. They exhibit physical and chemical properties of a thermoset polymer; exhibit uniform structural characteristics, i.e. isotropic with uniform tensile strength and elastomeric properties in both longitudinal and radial directions; and are chemically inert to a large number of corrosive chemical agents (see Table 1). The formulations are biologically inert, i.e., long term (one year) immersion in both water and soil produced no detectable alterations in either physical or chemical properties. They exhibit a conservative service temperature range of—100 degrees F to +300 degrees F; and do not themselves support combustion, i.e., if ignited, will self-extinguish. When applied as a surface coating of approximately 0.003–0.007 inches thick, the wood preservatives formulations allow transmission of water vapor, but not water liquid; when applied as a brushed-on surface sealant to water-based OCA-treated lumber, a single coat application reduces toxic CCA leaching by an average of 92%. When the formulations are used as an impregnation, the drying time required for handling and shipping lumber is reduced from several days to several hours. The formulations are exceptionally amenable to blending with a large variety of organic based dyes and colorants; most notable are the colorants manufactured by HULS AMERICA, INC., known as the 844 Colorant System. They are readily applied as a wood preservation impregnation via the present wood pressure treating system of sequential vacuum and pressure, but at notably lower values, e.g. 15–18 mm Kg vacuum, and 25–50 psi pressure.

The preparation procedure of Example No. 1 was repeated under the following conditions:

| Reagents | Volume | Stoichiometric Volume Ratio |
|---|---|---|
| 1) Acetone | 125 mls | 0.812 |
| 2) Primary diamine D-2000 | 14 mls | 0.091 |
| 3) Secondary diamine UOP 4200 | 30 mls | 0.019 |
| 4) Poly (oxyalkylene) polyol Multranol 4012 | 6.00 mls | 0.038 |
| 5) Diphenylmethane diisocyanate Rubinate 9433 | 6.2 mls | 0.041 |
| Total | 154.2 mls | 1.000 |

This formulation was developed specifically not only for its use in wood preservation, but also for the additional novel ability to enable a significant increase in the values of the wood's general physical strength properties, in particular the wood's compression stress resistance and amount of flexural bending before structural rupture or breaking. Ten test samples of porous poplar "sticks," 10" L×1" W×¼" thick, were thoroughly impregnated, i.e. interstitially fiber impregnated, with this formulation.

Results:
a) Tack-free dry time, 48 minutes average
b) Water absorption—exposure one hour, less than 0.02%
c) Increase in compression stress resistance—68–70%, pds per sq. inch
d) Increase in flexural bending angle before mechanical rupture—46–50% pounds per unit angle of deflection These percent increases were determined by comparison to 10 identical wood samples not impregnated.

The polymer chemistry-based formulations of the present invention for use as wood preservatives and preservation exhibit many desirable properties and characteristics. They are non-toxic; non-human carcinogenic; hydrophobic; elastomeric; termicidal; and chemically and structurally incapable of preservative leaching. The formulations are non-water based; resistant to solar ultraviolet exposure degradation; and exhibit a non-degraded, long-term effective elastomeric thermal stress response over a tested range of –80 degrees F. to +225 degrees F. The polymer chemistry-based wood preservative formulations are chemically classified as a polyureathane/urea cross-linked polymer. They exhibit physical and chemical properties of a thermoset polymer; exhibit uniform structural characteristics, i.e. isotropic with uniform tensile strength and elastomeric properties in both longitudinal and radial directions; and are chemically inert to a large number of corrosive chemical agents (see Table 1). The formulations are biologically inert, i.e., long term (one year) immersion in both water and soil produced no detectable alterations in either physical or chemical properties. They exhibit a conservative service temperature range of –100 degrees F. to +300 degrees F.; and do not themselves support combustion, i.e., if ignited, will self-extinguish. When applied as a surface coating of approximately 0.003–0.007 inches thick, the wood preservatives formulations allow transmission of water vapor, but not water liquid; when applied as a brushed-on surface sealant to water-based CCA-treated lumber, a single coat application reduces toxic CCA leaching by an average of 92%. When the formulations are used as an impregnation, the drying time required for handling and shipping lumber is reduced from several days to several hours. The formulations are exceptionally amenable to blending with a large variety of organic based dyes and colorants; most notable are the colorants manufactured by HULS AMERICA, INC., known as the 844 Colorant System. They are readily applied as a wood preservation impregnation via the present wood pressure treating system of sequential vacuum and pressure, but at notably lower values, e.g. 15–18 mm Kg vacuum, and 25–50 psi pressure.

Although disclosed herein as a wood preservative, the polymer chemistry-based formulations of the present invention find utility in a wide variety of applications as a preservative. Applications for which the present invention has been successfully tested include:

Protection coatings—Protects against corrosion, harsh chemical, high temperature, hydrocarbons and marine.

Abrasion and skid-resistant coating.

Mold and fungus resistant coatings for drywall and window and door frames. Penetrating stabilizer and sealant for house wood trim, door and window frames, millwork and finished wood.

Electrical signal junction box protection from outdoor exposure.

Electrical motor winding insulation.

Water-barrier seal coating.

Asphalt and concrete paving sealer.

Pipe coatings—metal, PVC, tile, concrete and glass.

Encapsulation of hazardous materials for underground burial.

Coatings for underground fuel tanks and tanks for other harsh fluids.

Corrosion leakage barrier.

Canvas and nylon fabric impregnation.

Potting and encapsulation.

Traffic control and direction marking and stripping.

Auto and truck body—long-term undercoating.

Additional applications for which the present invention is suited or would find significant utility include, but are not limited to:

Aircraft—de-icing coating.

Drywall—waterproofing, and fungus and mold prevention.

Roof coating—asphalt and felt rejuvenation; retrofit for EPOM roof coatings.

Primer for paint.

Primer for urethane roots and block walls.

Protective coating for sewer pipes and manholes.

Watercraft—low-friction hull coating.

Cardboard shipping containers—hi-penetrating sealer and coating.

Antifouling coating for Zebra/Quagga mussels in fresh water—low biofouling adhesion for mussels and bacterial and algal biofilms.

Pothole fill—comixing of Formula #2 and applicable gravel in matrix fill.

In the above applications, Formula #1 would be applied as a preparatory coating for all surfaces. Very porous surfaces such as asphalt, concrete, brick, stucco, fabric and the like, would optimally require two coats. For moderate or dense porosity surfaces, such as wood, metal, plastic and the like, one coat is generally adequate. The drying time between coats may be 1.5 to 3 hours, depending on ambient temperature and humidity. Additionally, where a penetrating sealer is required, two or more coats of Formula #2 would be applied to the surfaces prepared as above with Formula #1; corrosive environments would generally require three coats.

Although the present invention has been described herein with respect to particular features, aspects and embodiments thereof, it will be apparent that numerous variations, modifications, and other embodiments are possible within the broad scope of the present invention, and accordingly, all variations, modifications and embodiments are to be regarded as being within the scope of the invention. The present embodiments are therefore to be construed in all aspects as illustrative and not restrictive and all changes coming within the meaning and equivalency range of the appended claims are intended to be embraced therein.

TABLE 1

Physical Properties*

| | |
|---|---|
| 1. Shore Hardness | 6Q . . . A to SS-D |
| 2. Tensile Strength | 2200 to 7800 psi |
| 3. Elongation Before Yield | 320 to 520% |
| 4. Tear Die-C | 110 to 320 pli |
| 5. Tear Die 470 | 35 to 180 pli |
| 6. Elastomeric Rebound 4x Compression - 5 Min. | 72 to 96% |
| 7. Temperature Range | −150 F. to 500 F. |
| 8. Non-Cathodic | |

*NOTE:
The range of property values given are the range obtained with specific formulations developed to date.

TABLE 2

Chemical Properties
Material Reactivity Effects - 1 Week Exposure

| | | |
|---|---|---|
| 1. | Acetic Acid - 98% | None |
| 2. | Phosphoric - 85% | None |
| 3. | Sulfuric Acid - 25% | None |
| 4. | Sodium Hydroxide - 40% | None |
| 5. | Sodium Hydroxide - 25% | None |
| 6. | Ammonium Hydroxide - 28% | None |
| 7. | Formaldehyde - 37% | None |
| 8. | Hydrogen Peroxide - 5% | None |
| 9. | Acetone | Temporary .5 hour residual |
| 10. | Carbon Tetrachloride | None |
| 11. | Ether | None |
| 12. | Ethyl Acetate | Temporary .5 hour residual |
| 13. | Ethyl Acetate | None |
| 14. | Gasoline - 1 year | None |
| 15. | Methanol | None |
| 16. | Methyl Ethyl Ketone | None |
| 17. | Xylene | None |
| 18. | Motor Oils | None |
| 19. | Cooking Oils | None |
| 20. | Mineral Springs - Fuel Oil | None |
| 21. | Hydrofluoric Acid | None |
| 22. | Hydrofluoric Acid - 37%* | Slight Discoloration |
| 23. | Chromic Acid - 60% | Slight Discoloration |
| 24. | Formic Acid - 90%* | Slight Discoloration |
| 25. | Phenol - 85%* | Slight Discoloration |
| 26. | Clorox - 10% | None |

*NOTE:
The reaction significantly decreased when exposure was terminated.

TABLE 3

Physiological Properties

1. Non-Cytotoxic, MEM Elusion - MG 023 - 0 Dilution
2. Non-Hemolytic - In Vitro
3. Non-Pyrogenic - Test T10, Material Mediated
4. Non-Carcinogenic - Standard Ames Salmonena Tests

What is claimed is:

1. A composition for preservation of a cellulose based product, the composition comprising a mixture of:
a primary diamine in a volume ratio ranging from about 3.6% to about 12.2% v/v of the total solution; and
a secondary diamine in a volume ratio ranging from about 0.6% to about 6.8% v/v of the total solution.

2. The composition of claim 1 comprising from about 5.8% to about 9.6% v/v of the primary diamine and from about 2.4% to about 4.8% v/v of the secondary diamine.

3. The composition of claim 1 comprising from about 6.2% to about 7.8% v/v of the primary diamine and from about 2.8% to about 3.8% v/v of the secondary diamine.

4. The composition of claim 1 wherein the primary diamine and the secondary diamine are stoichiometrically balanced.

5. The composition of claim 1 wherein the primary diamine is a polyoxypropylene diamine.

6. The composition of claim 1 wherein the secondary diamine is a dialkylamino diphenylamines.

7. The composition of claim 1 further comprising a chain extension reagent.

8. The composition of claim 7 wherein the chain extension reagent is provided in an amount from about 2.0% to about 6.2% v/v of the composition.

9. The composition of claim 7 wherein the ratio of the primary diamine and secondary diamine to the chain extension reagent is from about 2.8:1 to about 3.8:1 by volume.

10. The composition of claim 7 wherein the chain extension reagent is selected from the group consisting of methylene-4,4'-diphenyl diisocyanate, MDI-containing resins, modified MDI, MDI-containing resins, aliphatic diisocyanates, aromatic diisocyanates, alicyclic diisocyanates, ethylene diisocyanate, ethylidene diisocyanate, propylene diisocyanate, butylene diisocyanate, cyclopentylene-1,3-diisocyanate, cyclohexylene-I,4-diisocyanate, cyclohexylene-1,2.diisocyanate, 2,4-tolylene diisocyanate, 2,6-tolylene diisocyanate, 4,4'-diphenylmethane diisocyanate, 2,2-diphenylpropane-4,4'-diisocyanate, p-phenylene diisocyanate, m-phenylene 15 diisocyanate, xylylene diisocyanate, 1,4-napthylene diisocyanate, 1,5-naphthylene diisocyanate, diphenyl-4,4' diisocyanate, azobenzene-4,4'-diisocyanate, diphenylsultone-4,4'-diisocyanate, dichiorohexamethylene diisocyanate, tetramethylene diisocyanate, pentametylene diisocyanate, hexamethylene diisocyanate, 1-chlorobenzene-2,4-diisocyanate, furfurylidene diisocyanate and triphenyl methane triisocyanate.

11. The composition of claim 1 further comprising a stabilizing carrier in an amount sufficient to prevent formation of a gel or solid prior to removal of a portion of the stabilizing carrier.

12. The composition of claim 11 wherein the chain stabilizing carrier is provided in an amount from about 60% to about 80% v/v of the composition.

13. The composition of claim 11 wherein the stabilizing carrier is selected from the group consisting of: acetone, methyl ethyl ketone, methylisobutylketone, N-methylcyclohexanone, acetaldehyde, propionaldehyde, butryaldehyde, isobutyraldehyde, methyl acetate, ethyl acetate, butyl acetate, methoxy propyl acetate, ethylene glycol, propylene glycol, butylene glycols, polyethylene glycol 200, polyethylene glycol 400 and polyethylene glycol 600.

14. The composition of claim 11 further comprising a secondary carrier for regulating viscosity.

15. The composition of claim 14 wherein the secondary carrier is provided in an amount from about 20% to about 38% v/v of the composition.

16. The composition of claim 14 wherein the secondary carrier is selected from the group consisting of: mineral spirits, N-methyl pyrrolidone and Solvesso solvent Lactone.

17. The composition of claim 1 further comprising a poly(oxyalkalene)polyol in an amount sufficient to support the function of a carrier solvent reactant.

18. The composition of claim 17 wherein the poly(oxyalkalene)polyol is provided in an amount from about 3.2% to about 4.6% v/v of the composition.

19. The composition of claim 17 wherein the poly(oxyalkalene)polyol is selected from the group consisting of: propylene oxide adducts of trimethylol propane, $(C_3H_6O)_{12}$ $C_6H_{14}O_3$ and CAS π25723-16-4.

20. The composition of claim 1 further comprising a colorant or pigment.

21. The composition of claim 1 having a viscosity sufficient to enable impregnation of wood under a system of sequential vacuum and pressure, wherein the vacuum ranges from about 15 to about 28 in of mercury and the pressure ranges from about 1.5 to about 100 psi.

22. The composition of claim 21 wherein the vacuum ranges from about 20 to about 26 in Hg and the pressure ranges from about 20 to about 70 psi.

23. The composition of claim 21 wherein the vacuum ranges from about 15 to about 18 in Hg and the pressure ranges from about 25 to about 50 psi.

24. A wood product treated for preservation by coating or impregnating with a polyurethane/urea linked copolymer formed by the sequential steps of
combining an oligomeric, stoichiometrically balanced blend of primary and secondary diamines with modified diphenylmethane diisocyanates and a first carrier solvent/reactant to form a one-part solution having a shelf life of at least 6 months;
coating or impregnating a wood product with the solution; and
drying the solution to form a polyurethane/urea linked copolymer coated or impregnated wood product.

25. The treated wood of claim 24 wherein the first carrier solvent/reactant comprises acetone.

26. The treated wood of claim 24 wherein the solution additionally includes a second carrier solvent/reactant.

27. The treated wood of claim 26 wherein the second carrier solvent/reactant comprises mineral spirits.

28. The treated wood of claim 24 wherein the solution additionally includes a polyether oxyalkylene polyol.

29. The treated wood of claim 24 wherein in the wood is isotropically impregnated.

30. The treated wood of claim 24 wherein in the wood is non-supportive of combustion.

31. The treated wood of claim 24 wherein the wood is termicidal.

32. The treated wood of claim 24 wherein the wood meets non-hazardous landfill requirements for waste disposal.

33. The treated wood of claim 24 wherein the wood does not degrade from exposure to solar ultraviolet exposure.

34. The treated wood of claim 24 wherein polymerization of the polyurethane/urea linked copolymer is initiated immediately upon application of the polyurethane/urea linked copolymer to the wood, without a modification of external ambient conditions.

35. The treated wood of claim 24 wherein the polyurethane/urea linked copolymer has a % distention-to-yield value of about 450% to about 680%.

36. The treated wood product of claim 24 wherein the coating or impregnating step may be performed when the wood is damp.

37. The treated wood product of claim 24 wherein the solution further includes a colorant or stain.

38. The treated wood product of claim 24 wherein the wood product comprises a wood product previously treated with a CCA preservative, and wherein the application of the polyurethane/urea linked copolymer essentially prevents leaching out of the CCA preservative.

39. The treated wood product of claim 24 wherein the wood product is impregnated with the solution under a system of sequential vacuum and pressure.

40. The treated wood product of claim 39 wherein the vacuum ranges from about 15 to about 28 in. of mercury and the pressure ranges from about 1.5 to about 100 psi.

41. The treated wood product of claim 40 wherein the vacuum ranges from about 20 to about 26 in. Hg and the pressure ranges from about 20 to about 70 psi.

42. The treated wood product of claim 40 wherein the vacuum ranges from about 15 to about 18 in. Hg and the pressure ranges from about 25 to about 50 psi.

43. The treated wood product of claim 24 wherein the polyurethane/urea linked copolymer is applied to the surface of the wood product.

44. A method of substantially eliminating the leaching out of toxic preservative chemicals from conventionally treated wood, comprising:
combining an oligomeric, stoichiometrically balanced blend of primary and secondary diamines with modified diphenylmethane diisocyanates and a first carrier solvent/reactant to form a solution;
coating the conventionally treated wood with the solution; and
drying the solution to form a polyurethane/urea linked copolymer coating on the conventionally treated wood that substantially eliminates the leaching out of toxic preservative chemicals from the conventionally treated wood.

45. The method of claim 44 wherein the conventionally treated wood is CCA-treated wood.

46. The method of claim 45 wherein the toxic preservative chemicals prevented from leaching out include copper, chromium and arsenic.

47. The method of claim 44 wherein coating the conventionally treated wood with the solution comprises coating conventionally treated wood in place in existing structures.

48. The method of claim 47 wherein coating conventionally treated wood in place in existing structures comprising spraying the solution onto the conventionally treated wood.

49. The method of claim 47 wherein coating conventionally treated wood in place in existing structures comprising painting the solution onto the conventionally treated wood.

50. The method of claim 47 wherein the solution additionally includes a colorant.

* * * * *